(12) United States Patent
Sekine (10) Patent No.: US 9,569,148 B2
(45) Date of Patent: Feb. 14, 2017

(54) PRINTING APPARATUS ENABLING TWO-SIDED PRINTING, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hiroshi Sekine, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/944,541

(22) Filed: Nov. 18, 2015

(65) Prior Publication Data

US 2016/0147486 A1 May 26, 2016

(30) Foreign Application Priority Data

Nov. 20, 2014 (JP) .................................. 2014-235505

(51) Int. Cl.
*G03G 15/00* (2006.01)
*G06F 3/12* (2006.01)

(52) U.S. Cl.
CPC ........... *G06F 3/1215* (2013.01); *G06F 3/1244* (2013.01); *G06F 3/1285* (2013.01)

(58) Field of Classification Search
CPC .................................................. G06F 3/1215
USPC ....................................................... 399/401
See application file for complete search history.

(56) References Cited

U.S. PATENT DOCUMENTS

| 5,471,564 | A | * | 11/1995 | Dennis | ................... | G06F 3/1296 |
| | | | | | | 358/1.11 |
| 5,839,014 | A | * | 11/1998 | Takahashi | .......... | G03G 15/5012 |
| | | | | | | 399/21 |
| 6,081,687 | A | * | 6/2000 | Munemori | ............. | G03G 15/23 |
| | | | | | | 358/300 |
| 7,185,981 | B2 | * | 3/2007 | Tham | ......................... | B41J 3/60 |
| | | | | | | 347/102 |
| 7,983,585 | B2 | | 7/2011 | Miyahara | | |
| 8,190,079 | B2 | * | 5/2012 | Mohri | ................ | G03G 15/5012 |
| | | | | | | 399/364 |
| 9,463,647 | B1 | * | 10/2016 | Inaba | ..................... | B41J 25/001 |

(Continued)

FOREIGN PATENT DOCUMENTS

JP 2002337417 A 11/2002
JP 2010173186 A 8/2010

*Primary Examiner* — Anthony Nguyen
(74) *Attorney, Agent, or Firm* — Rossi, Kimms & McDowell LLP (57) ABSTRACT

A printing apparatus that is capable of performing a printing process efficiently. The printing apparatus is capable of two-sided printing. A reception unit receives image data. A printing unit prints an image on a sheet based on the image data received. A timer unit measures elapsed time. A control unit instructs the printing unit to print a first side of a first sheet. The control unit decides whether printing of a second side of the first sheet or printing of a first side of a second sheet will be instructed following the printing of the first side of the first sheet based on whether the reception unit receives image data that should be printed on the first side of the second sheet before the elapsed time measured by the timer unit reaches a predetermined time period after instructing the printing unit to print the first side of the first sheet.

10 Claims, 8 Drawing Sheets

(56) References Cited

U.S. PATENT DOCUMENTS

2011/0235101 A1* 9/2011 Misawa ................ G06F 3/1212
358/1.15

* cited by examiner

PRINTING APPARATUS ENABLING TWO-SIDED PRINTING, CONTROL METHOD THEREFOR, AND STORAGE MEDIUM STORING CONTROL PROGRAM THEREFOR

BACKGROUND OF THE INVENTION

Field of the Invention

The present invention relates to printing apparatuses enabling two-sided printing and, in particular, relates to a printing apparatus performing a two-sided printing process at high speed, a control method therefore, and a storage medium storing a control program therefor.

Description of the Related Art

When performing two-sided printing using a plurality of sheets, a printing apparatus sequentially obtains a print data corresponding to each page from a first page, generates image processing data by performing an image process on the obtained print data, and prints the image processing data on front and back sides of each sheet. There is known two-sided printing (hereinafter referred to as "normal two-sided printing") by which a print data corresponding to each page is printed on back and front side of each sheet in the order of page 2, page 1, page 4, page 3, page 6, and page 5. Moreover, there is also known two-sided printing (hereinafter referred to as "high-speed two-sided printing") by which a print data corresponding to each page is printed in the order of page 2, page 4, page 1, page 6, page 3, and page 5 in order to shorten printing waiting time resulting from conveyance of sheets in printing (for example, see Japanese Laid-Open Patent Publication (Kokai) No. 2002-337417 (JP 2002-337417A)).

Basically, printing on each sheet is started after image processing data that will be printed on a sheet is generated. However, in the high-speed two-sided printing, since priority is given to improvement in efficiency of the conveyance of each sheet and each sheet is conveyed regardless of an order of obtaining print data, an image processing data corresponding to a certain sheet may not be generated by the time when printing on the certain sheet is started. In this case, a printing-process error occurs and a sheet in printing stays in the printing apparatus, for example. That is, in the high-speed two-sided printing, when an image processing data corresponding to a sheet is not generated at the start time of printing on the sheet concerned, the printing process enters into a suspended state (for example, see Japanese Laid-Open Patent Publication (Kokai) No. 2010-173186 (JP 2010-173186A)).

Accordingly, the technique of JP 2010-173186A deteriorates efficiency of the printing process when generation of the image processing data takes time.

SUMMARY OF THE INVENTION

The present invention provides a printing apparatus, a control method therefor, and a storage medium storing a control program therefor, which are capable of performing a printing process efficiently.

Accordingly, a first aspect of the present invention provides a printing apparatus capable of two-sided printing, including a reception unit configured to receive image data, a printing unit configured to print an image on a sheet based on the image data received by the reception unit, a timer unit configured to measure elapsed time, and a control unit configured to instruct the printing unit to print a first side of a first sheet and to decide whether printing of a second side of the first sheet or printing of a first side of a second sheet will be instructed following the printing of the first side of the first sheet based on whether the reception unit receives image data that should be printed on the first side of the second sheet before the elapsed time measured by the timer unit reaches a predetermined time period after instructing the printing unit to print the first side of the first sheet.

Accordingly, a second aspect of the present invention provides a printing apparatus capable of two-sided printing, including a reception unit configured to receive image data, a printing unit configured to print an image on a sheet based on the image data received by the reception unit, a timer unit configured to measure elapsed time, and a control unit configured to instruct the printing unit to print a first side of an (N−1)th sheet and to decide whether printing of a second side of the (N−1)th sheet or printing of a first side of an N-th sheet will be instructed following the printing of the first side of the (N−1)th sheet based on whether the reception unit receives image data that should be printed on the first side of the N-th sheet before the elapsed time measured by the timer unit reaches a predetermined time period after instructing the printing unit to print the first side of the (N−1)th sheet, wherein N is an integer that is equal to or larger than "2".

Accordingly, a third aspect of the present invention provides a control method for a printing apparatus that is equipped with a printing unit that prints an image on a sheet based on image data and a timer unit that measures elapsed time, and is capable of two-sided printing, the control method including receiving image data that should be printed on a first side of a first sheet, instructing the printing unit to print the first side of the first sheet, determining whether image data that should be printed on a first side of a second sheet is received before the elapsed time measured by the timer unit reaches a predetermined time period after the instructing, and deciding whether printing of a second side of the first sheet or printing of the first side of the second sheet will be instructed to the printing unit following the printing of the first side of the first sheet based on a result of the determining.

Accordingly, a fourth aspect of the present invention provides a control method for a printing apparatus that is equipped with a printing unit that prints an image on a sheet based on image data and a timer unit that measures elapsed time, and is capable of two-sided printing, the control method including receiving image data that should be printed on a first side of an (N−1)th sheet (N being equal to or larger than "2"), instructing the printing unit to print the first side of the (N−1)th sheet, determining whether image data that should be printed on a first side of an N-th sheet is received before the elapsed time measured by the timer unit reaches a predetermined time period after the instructing, and deciding whether printing of a second side of the (N−1)th sheet or printing of the first side of the N-th sheet will be instructed to the printing unit following the printing of the first side of the (N−1)th sheet based on a result of the determining.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, since a printing process is continued without waiting to obtain a print data for printing on a front or back side of another sheet for a long time, the printing process is performed efficiently.

Further features of the present invention will become apparent from the following description of exemplary embodiments with reference to the attached drawings.

BRIEF DESCRIPTION OF THE DRAWINGS

FIG. 6A, FIG. 6B, and FIG. 6C illustrate printing orders of two-sided printings executed by the image forming apparatus in FIG. 1.

DESCRIPTION OF THE EMBODIMENTS

Hereafter, embodiments according to the present invention will be described in detail with reference to the drawings.

Figure 1:
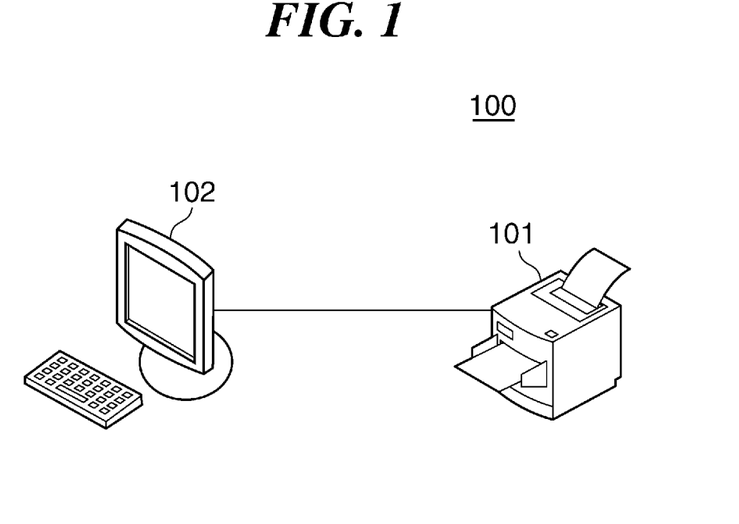
FIG. 1 is a block diagram schematically showing an image forming system including an image forming apparatus (printing apparatus) according to an embodiment of the present invention.

FIG. 1 is a block diagram schematically showing an image forming system 100 including an image forming apparatus (printing apparatus) 101 according to an embodiment of the present invention.

As shown in FIG. 1, the image forming system 100 is provided with the image forming apparatus 101 and an information processing apparatus 102. The image forming apparatus 101 and the information processing apparatus 102 are connected through a USB cable or various networks, such as a wired network and a wireless network.

In the image forming system 100, the information processing apparatus 102 generates print data and transmits the print data concerned to the image forming apparatus 101. The image forming apparatus 101 prints according to the transmitted print data.

Figure 2:
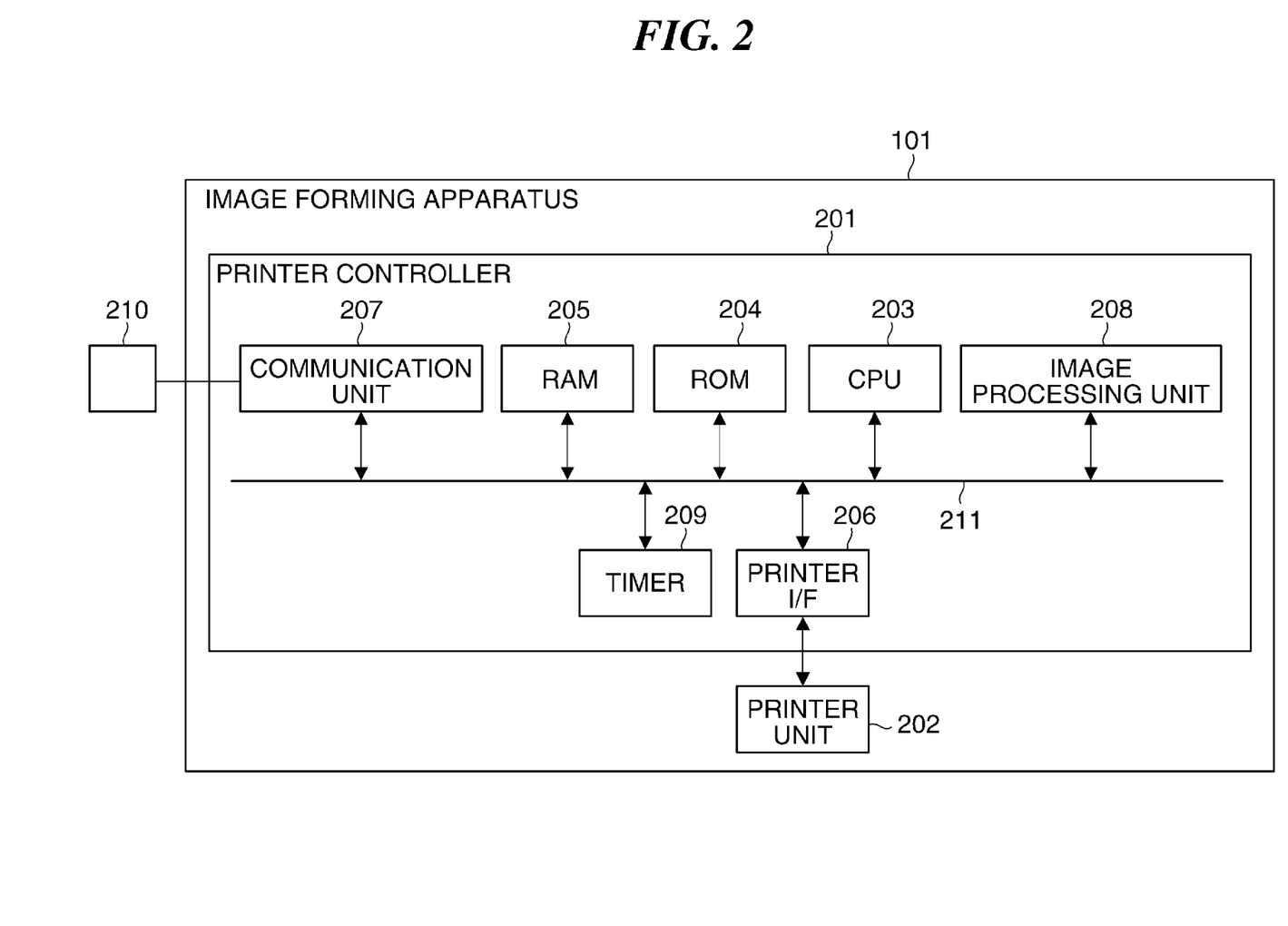
FIG. 2 is a block diagram schematically showing a configuration of the image forming apparatus in FIG. 1.

FIG. 2 is a block diagram schematically showing a configuration of the image forming apparatus 101 in FIG. 1.

As shown in FIG. 2, the image forming apparatus 101 is provided with a printer controller 201 and a printer unit 202. The printer controller 201 is provided with a CPU 203, a ROM 204, a RAM 205, a printer I/F 206, a communication unit 207, an image processing unit 208, and a timer 209. These components are mutually connected via a bus 211.

The CPU 203 totally controls the image forming apparatus 101. The ROM 204 is a boot ROM that stores a boot program of the image forming apparatus 101. The RAM 205 is used as a system work memory for the CPU 203. The printer I/F 206 performs data communication with the printer unit 202. The communication unit 207 performs data communication with the information processing apparatus 102 that is connected through a connection connector 210, and receives print data transmitted from the information processing apparatus 102, for example. The image processing unit 208 performs an image process to generate data for printing when printing on the basis of the print data transmitted from the information processing apparatus 102.

The timer 209 measures a predetermined time period set up according to a control signal transmitted from the CPU 203. The timer 209 gives notice to the CPU 203 when the set-up predetermined time period elapses.

Figure 3:
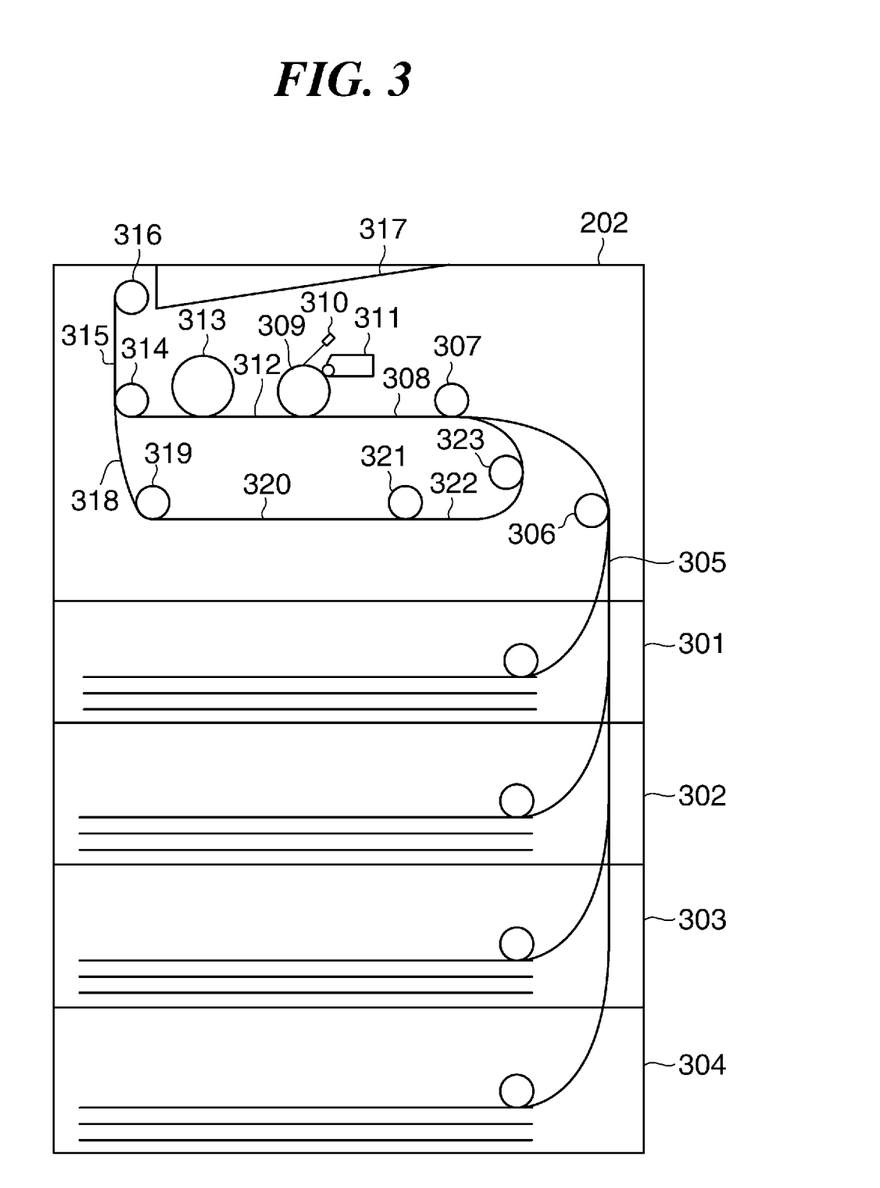
FIG. 3 is a side view of a printer unit in FIG. 2 illustrating a schematic configuration thereof.

FIG. 3 is a side view of the printer unit 202 in FIG. 2 illustrating a schematic configuration thereof. It should be noted that FIG. 3 illustrates the internal components that are transparent in order to facilitate understanding.

As shown in FIG. 3, the printer unit 202 is provided with cassettes 301 to 304, a conveyance path 305, a conveyance path roller 306, a feed roller 307, a printing conveyance path 308, a transfer unit 309, a laser unit 310, a toner cartridge 311, a fixing conveyance path 312, a fixing roller 313, a switch back roller 314, an ejection conveyance path 315, an ejection roller 316, an ejection tray 317, a switchback conveyance path 318, two-sided rollers 319 and 321, a two-sided conveyance path 320, a two-sided feed conveyance path 322, and a two-sided feed roller 323.

In the printer unit 202, a plurality of sheets are stored in each of the cassettes 301 to 304. When a control signal as a print start instruction that is transmitted from the printer controller 201 is received, a sheet stored in any one of the cassettes 301 to 304 is conveyed to the conveyance path 305 according to the control signal received. A first sheet conveyed to the conveyance path 305 is conveyed by the conveyance path roller 306 and the feed roller 307 to the printing conveyance path 308.

The transfer unit 309 transfers an image onto one side (a first side) of the first sheet conveyed to the printing conveyance path 308. In the transfer unit 309, the laser unit 310 forms an image, and the toner cartridge 311 develops a formed image with toner. The first sheet on which the image is transferred by the transfer unit 309 is conveyed to the fixing conveyance path 312, and the fixing roller 313 fixes the transferred image. In one-sided printing, the first sheet on which the image has been fixed by the fixing roller 313 is conveyed to the ejection conveyance path 315 by the switch back roller 314, and is ejected to the ejection tray 317 by the ejection roller 316.

On the other hand, in two-sided printing, the first sheet on which the image has been fixed to the first side by the fixing roller 313 is conveyed to the ejection conveyance path 315 by the switch back roller 314. Then, the first sheet is conveyed to the switchback conveyance path 318 by the switch back roller 314 that counter-rotates, and is conveyed to the two-sided conveyance path 320 by the two-sided roller 319. When normal two-sided printing is performed, the first sheet is conveyed to the two-sided feed conveyance path 322 by the two-sided roller 321 without waiting on the two-sided conveyance path 320, and is conveyed to the printing conveyance path 308 by the double-sided feed roller 323 and the feed roller 307 so that an image is printed on a second side of the first sheet.

Accordingly, there is print-waiting time in which neither the transfer unit 309 nor the fixing roller 313 prints before the first sheet concerned is again conveyed to the printing conveyance path 308 via the two-sided conveyance path 320 and the two-sided feeding conveyance path 322 after printing the first side of the first sheet by the transfer unit 309 and the fixing roller 313.

Moreover, when high-speed two-sided printing is performed, a second sheet is fed from one of the cassettes 301 to 304 and is conveyed to the printing conveyance path 308 so that the second sheet is printed in a period between a timing at which the first sheet is transferred to the switchback conveyance path 318 and a timing at which the first sheet is conveyed to the printing conveyance path 308. Thus, the high-speed two-sided printing shortens the printing waiting time in the two-sided printing.

Next, the transfer unit 309 transfers an image onto the second sheet conveyed to the printing conveyance path 308, the second sheet is conveyed to the fixing conveyance path 312, and the fixing roller 313 fixes the image to the second sheet. When the second sheet to which the image is fixed is conveyed to the switchback conveyance path 318, the first sheet is conveyed to the printing conveyance path 308 by the two-sided roller 321, the double-sided feed roller 323, and the feed roller 307, and an image is printed on the second side of the first sheet by the transfer unit 309 and the fixing roller 313.

Specifically, the transfer unit 309 transfers the image onto the second side (i.e., the side on which no image has been transferred) of the first sheet, and the fixing roller 313 fixes the image transferred to the first sheet. The first sheet to which the images have been printed on both the sides is conveyed to the ejection conveyance path 315 by the switch back roller 314, and is ejected to the ejection tray 317 by the ejection roller 316. It should be noted that a size of a sheet that is subjected to the high-speed two-sided printing is determined according to the length of the two-sided conveyance path 320.

Figure 4:
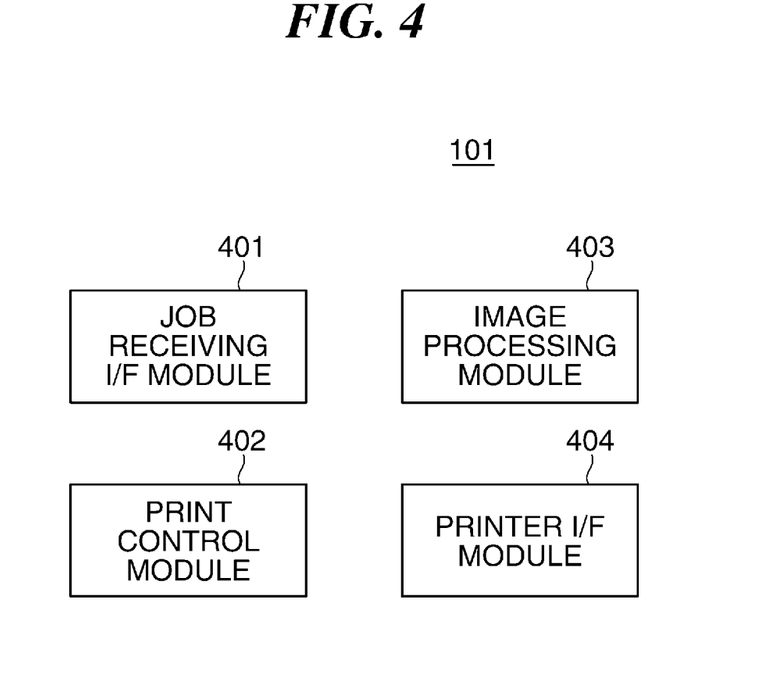
FIG. 4 is a block diagram schematically showing a software configuration of the image forming apparatus in FIG. 1.

FIG. 4 is a block diagram schematically showing a software configuration of the image forming apparatus 101 in FIG. 1.

As shown in FIG. 4, the image forming apparatus 101 is provided with a job receiving I/F module 401, a print control module 402, an image processing module 403, and a printer I/F module 404.

The job receiving I/F module 401 controls the communication module 207 to receive a print data with page information from the information processing apparatus 102, and transmits an acknowledgement to the print control module 402 according to the print data obtained. The print control module 402 transmits feed notice that is a sheet feeding instruction or conveyance notice that is a sheet conveyance instruction to the printer I/F module 404.

Moreover, the print control module 402 transmits rendering notice used as a start instruction for an image process, which generates a data for printing corresponding to each page to print, to the image processing module 403.

Furthermore, the print control module 402 transmits print start notice that is an instruction of a start of printing to the printer I/F module 404. The image processing module 403 performs an image process according to the rendering notice transmitted from the print control module 402.

Moreover, the image processing module 403 transmits rendering end notice to the print control module 402 after the image process is completed. The printer I/F module 404 controls the printer I/F 206 to transmit the control signals, which correspond to the feed notice and conveyance notice that were transmitted from the print control module 402, to the printer unit 202. The printer I/F module 404 transmits reception notice to the print control module 402 in response to a signal that was transmitted from the printer unit 202 and that indicates that feeding and conveyance are possible.

Next, a two-sided printing process in the embodiment will be described.

Figure 5:
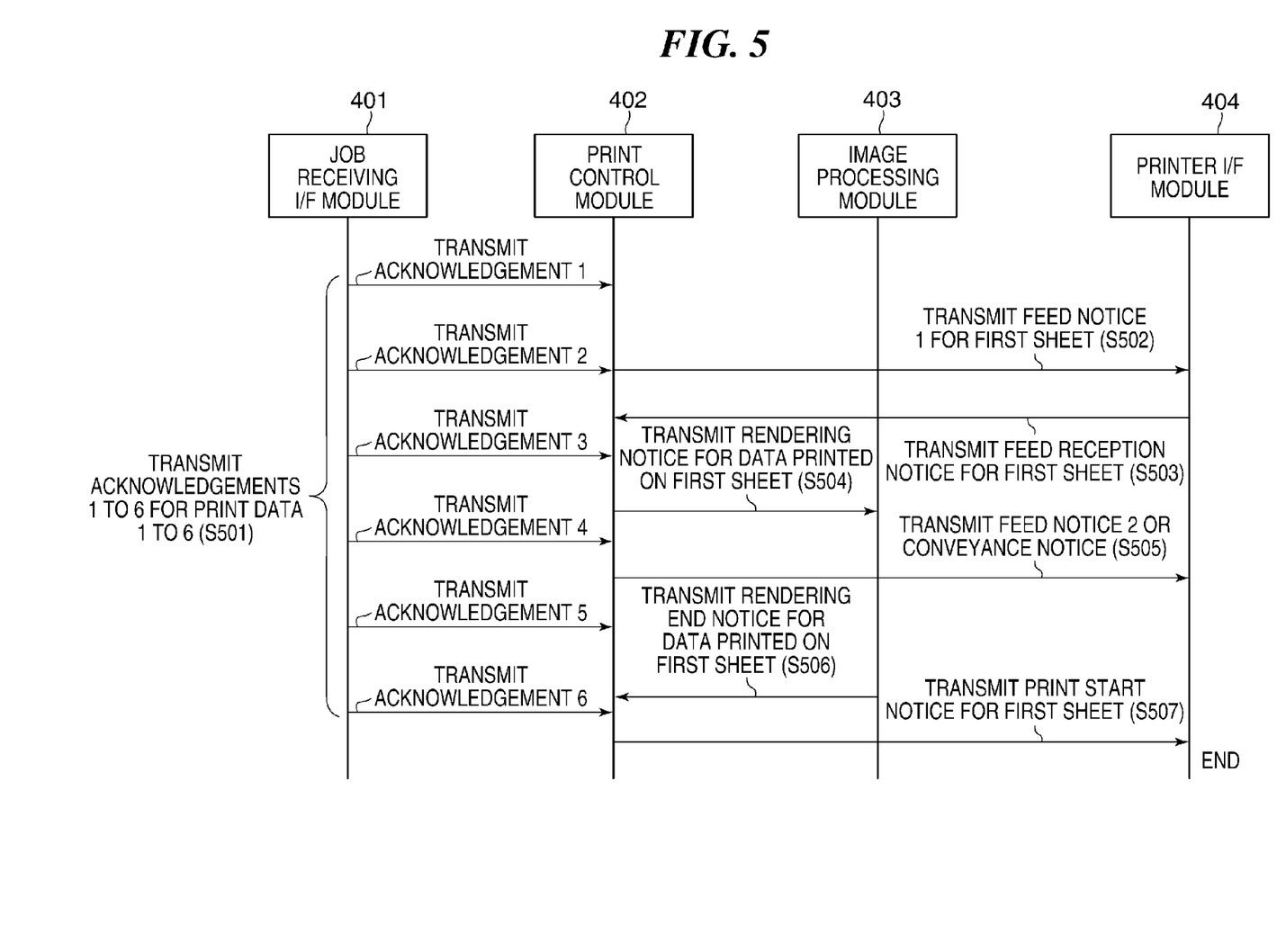
FIG. 5 is a timing chart illustrating a two-sided printing process executed by the image forming apparatus in FIG. 1.

FIG. 5 is a timing chart illustrating the two-sided printing process executed by the image forming apparatus 101 in FIG. 1.

The timing chart in FIG. 5 illustrates the communication timings of the data communication performed among the job receiving I/F module 401, the print control module 402, the image processing module 403, and the printer I/F module 404 in FIG. 4.

Figure 6A:
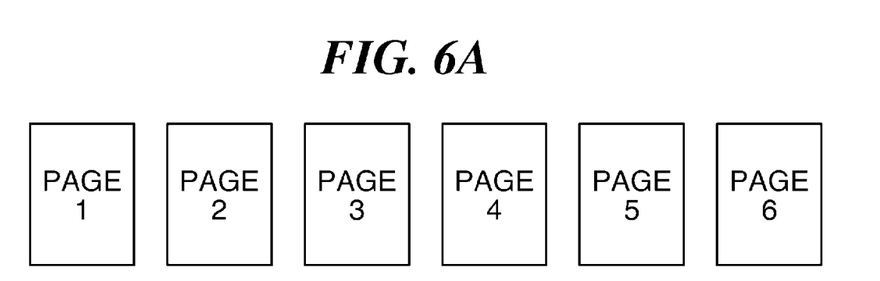
FIG. 6A illustrates a receiving order of the print data 1 to 6.

For example, there are print data 1 to 6 corresponding to the respective pages 1 to 6 in the two-sided printing process of the embodiment. As shown in FIG. 6A, the information processing apparatus 102 transmits the print data 1 to 6 in a page order from the print data 1 for the first page (page 1).

Figure 6B:
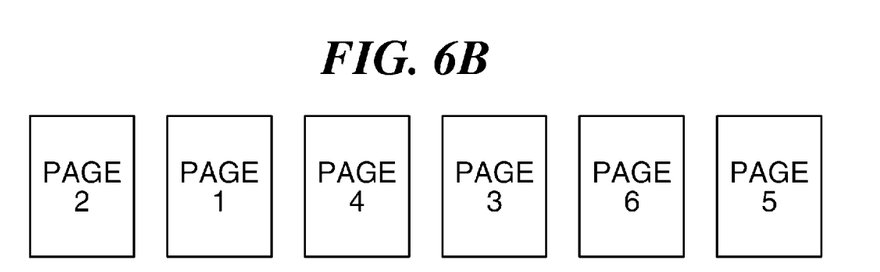
FIG. 6B illustrates the printing order of pages in normal two-sided printing.

The normal two-sided printing is performed according to the conveyance order of sheets. For example, as shown in FIG. 6B, printing is performed in the order of page 2, page 1, page 4, page 3, page 6, and page 5. That is, the printing is performed in the order of the first side of the first sheet, the second side of the first sheet, the first side of the second sheet, the second side of the second sheet, the first side of the third sheet, and the second side of the third sheet.

Figure 6C:
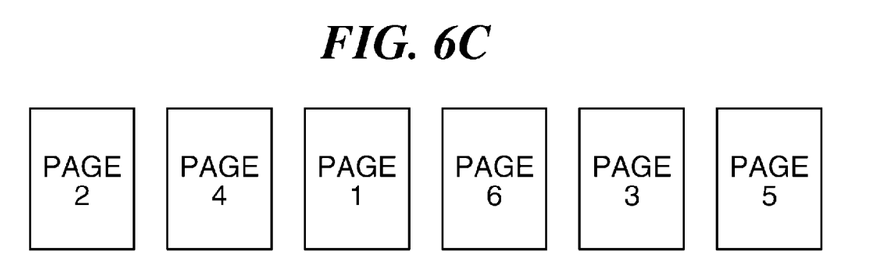
FIG. 6C illustrates the printing order of pages in high-speed two-sided printing.

On the other hand, the high-speed two-sided printing is performed regardless of the conveyance order of sheets. For example, as shown in FIG. 6C, printing is performed in the order of page 2, page 4, page 1, page 6, page 3, and page 5. That is, the printing is performed in the order of the first side of the first sheet, the first side of the second sheet, the second side of the first sheet, the first side of the third sheet, the second side of the second sheet, and the second side of the third sheet.

As shown in FIG. 5, when receiving the print data 1 for the page 1 from the information processing apparatus 102, the job receiving I/F module 401 transmits an acknowledgement 1, which indicates that the print data 1 for the page 1 is obtained, to the print control module 402. Similarly, when receiving the print data 2 to 6 for the pages 2 to 6 in order, the job receiving I/F module 401 transmits acknowledgements 2 to 6, which indicate that the print data 2 to 6 for the pages 2 to 6 are obtained, to the print control module 402 in order (step S501).

Furthermore, when receiving the print data 6 for the last page 6, the job receiving I/F module 401 transmits last page notice, which indicates that the acknowledgement 6 concerned is an acknowledgement for the last page, to the print control module 402, after transmitting the acknowledgement 6. The acknowledgements 1 to 6 include the information that specifies whether the one-sided printing or the two-sided printing will be performed and the information that specifies the sheet size to print.

Next, the print control module 402 determines to perform two-sided printing on the basis of the received acknowledgement 1. Furthermore, when receiving the acknowledgement 2 following the acknowledgement 1, the print control module 402 transmits feed notice 1, which is an instruction to feed the first sheet that is used for printing the page 2, to the printer I/F module 404 in response to the acknowledgement 2 concerned (step S502).

Next, the printer I/F module 404 transmits a control signal that is a feed instruction to the printer unit 202 in response to the received feed notice 1. Furthermore, when receiving notice indicating that feeding of a sheet is possible from the printer unit 202, the printer I/F module 404 transmits feed reception notice for the first sheet indicating reception of the feed notice 1 to the print control module 402 (step S503).

When receiving the feed reception notice for the first sheet, the print control module 402 transmits the rendering notice that indicates an instruction of the image process for generating data printed on the page 2, i.e., the first side of the first sheet, to the image processing module 403 (step S504).

Next, the print control module 402 transmits the feed notice 2 that is a feed instruction for a second sheet printed next or the conveyance notice that is a conveyance instruction for the first sheet to the printer I/F module 404 according to the state of the two-sided printing (step S505). Specifically, when the normal two-sided printing is performed, the conveyance notice of the sheet used for printing on the page 2 as illustrated in FIG. 6B, i.e., the conveyance notice that instructs conveyance of the first sheet of which the second side is a print side, is transmitted to the printer I/F module 404. On the other hand, when the high-speed two-sided printing is performed, the feed notice 2 that instructs feeding of the second sheet that is used to print the page 4 as illustrated in FIG. 6C is transmitted to the printer I/F module 404.

Next, when the image process corresponding to the received rendering notice is finished, the image processing module 403 transmits the rendering end notice about the print data for the first sheet to the print control module 402 (step S506). The rendering end notice indicates that the image process corresponding to the printing on the page 2, i.e., the first side of the first sheet, ends.

Next, the print control module 402 transmits the print start notice, which is an instruction of the start of printing of the page 2 (i.e., the first side of the first sheet), to the printer I/F module 404 in response to the received rendering end notice for the data printed on the first side of the first sheet (step S507).

After that, the process that is identical to the process in the steps S503 to S507 is performed. When the normal two-sided printing is performed at this time, the printing is performed in the order of the second side of the first sheet, the first side of the second sheet, the second side of the second sheet, the first side of the third sheet, and the second side of the third sheet. That is, the normal two-sided printing is performed according to the order of conveyance of the sheets. On the other hand, when the high-speed two-sided printing is performed, the printing is performed in the order of the first side of the second sheet, the second side of the first sheet, the first side of the third sheet, the second side of the second sheet, and the second side of the third sheet. That is, the high-speed two-sided printing is performed regardless of the conveyance order of sheets.

Figure 7A:
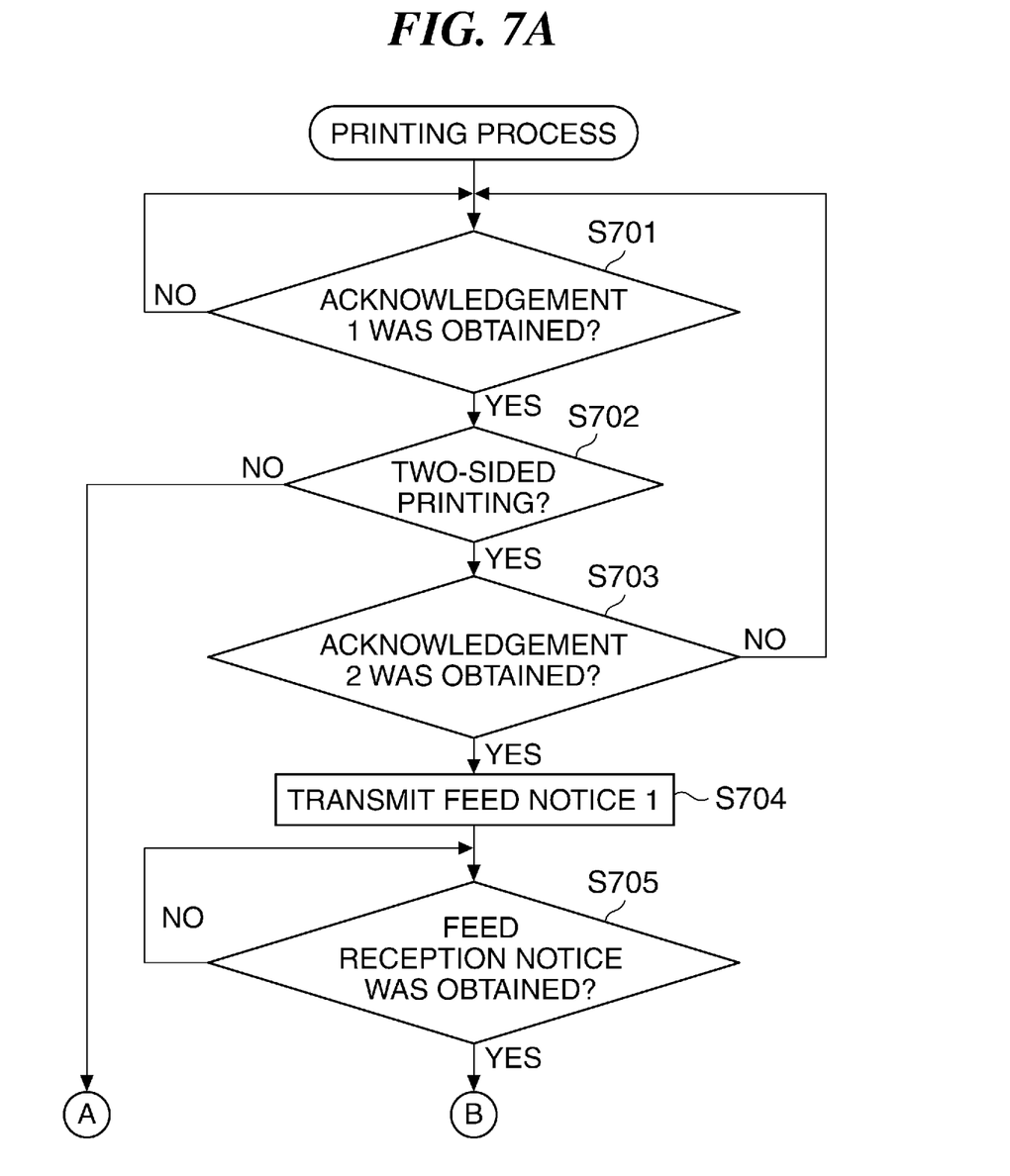
FIG. 7A and FIG. 7B are flowcharts illustrating procedures of a high-speed two-sided printing process executed by a printer controller in FIG. 1.
Figure 7B:
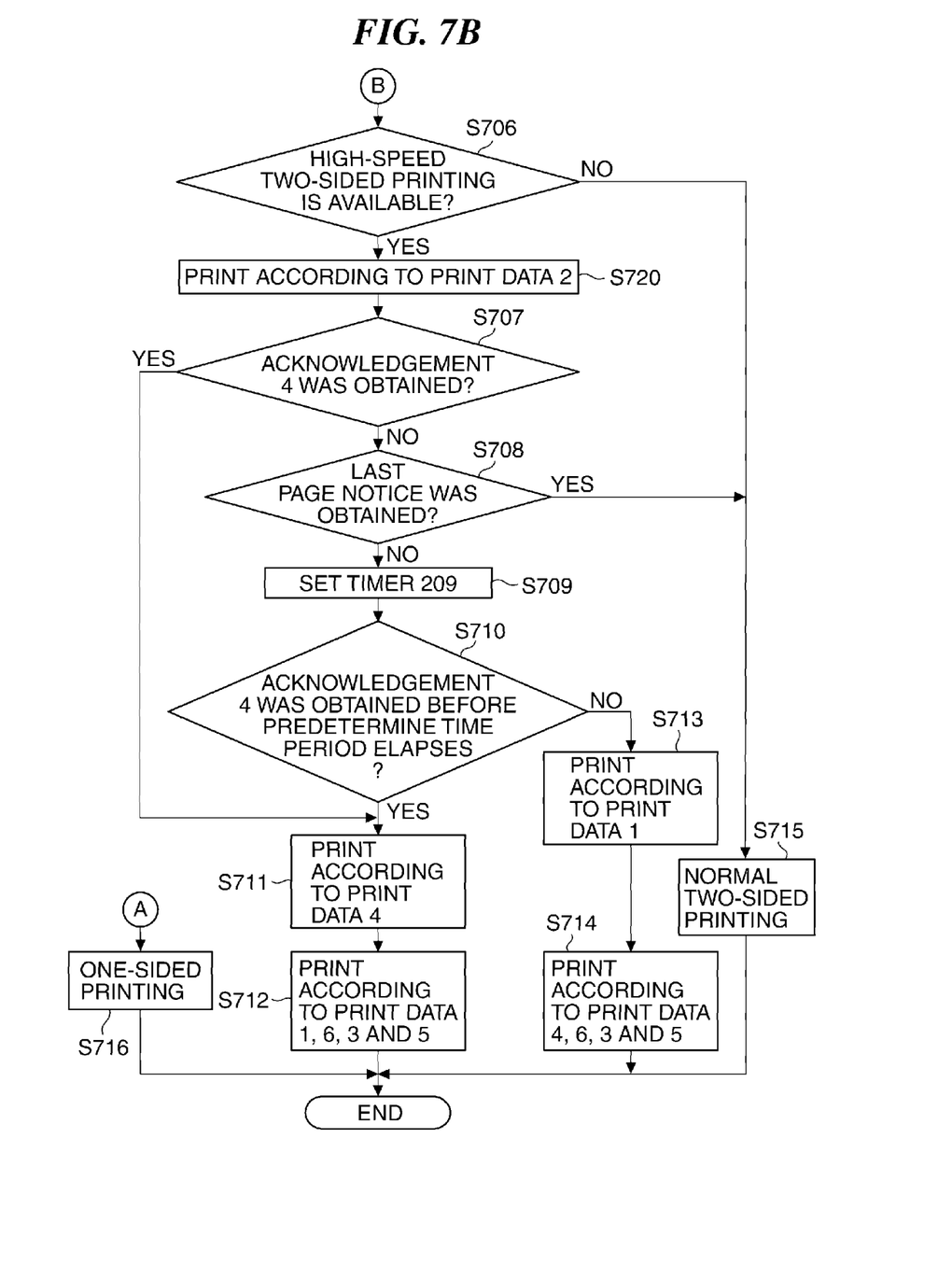

FIG. 7A and FIG. 7B are flowcharts illustrating procedures of a high-speed two-sided printing process executed by the printer controller 201 in FIG. 1.

As mentioned above, since the image forming apparatus 101 obtains the print data 1 to 6 for the respective pages in the page order, the data are almost obtained in the conveyance order of the sheets. The high-speed two-sided printing process is performed regardless of the conveyance order of sheets. However, since the transmission interval of the acknowledgements 1 to 6 is extremely shorter than the execution interval of printing according to the print data 1 to 6 as illustrated in FIG. 5, the print data that should be printed on the sheet concerned is usually obtained before the sheet is conveyed.

However, when the data volume of the print data 1 to 6 is large, for example, the transmission interval of the acknowledgements 1 to 6 becomes long because the data communication of the print data 1 to 6 takes time. This may cause a state where a print data that should be printed on a conveyed sheet is not obtained before the sheet is conveyed (hereinafter referred to as a "print data non-obtained state") in the high-speed two-sided printing processing.

Particularly, the print data 4 for the page 4 has the highest possibility to cause the print data non-obtained state. The reason is because the second sheet on which the print data 4 is printed is conveyed continuously after the printing of the first side of the first sheet (i.e., the second sheet is conveyed secondary (see FIG. 6C)), while the print data 4 is obtained after the print data 1 to 3 are obtained (i.e., the print data 4 is obtained fourthly (see FIG. 6A)). In this case, since the feed notice 2 is not transmitted and the printing of the first side of the second sheet is not performed before the print data 4 is obtained, the efficiency of the printing process deteriorates.

In view of this, the image forming apparatus 101 in this embodiment interrupts the high-speed two-sided printing and performs the normal two-sided printing when the acknowledgement 4, which indicates that the print data 4 to be printed on the first side of the second sheet is obtained, has not yet obtained in the high-speed two-sided printing.

In FIG. 7A, when receiving the acknowledgement 1 indicating that the print data 1 for the page 1 was obtained with the print control module 402 (YES in step S701), the printer controller 201 determines which of the one-sided printing or the two-sided printing will be performed on the basis of the obtained acknowledgement 1 (step S702).

When determining that the one-sided printing will be performed in the step S702, the printer controller 201 performs the one-sided printing (step S716), and finishes this process.

When determining that the two-sided printing will be performed in the step S702, the printer controller 201 determines whether the acknowledgement 2, which indicates that the print data 2 for the page 2 (i.e., the print data 2 that should be printed on the first side of the first sheet) is obtained, was obtained (step S703).

As a result of the determination in the step S703, when the acknowledgement 2 was not obtained, the process returns to the step S701.

As a result of the determination in the step S703, when the acknowledgement 2 was obtained, the printer controller 201 transmits the feed notice 1 for the sheet used to print the page 2 (i.e., the first sheet) with the print control module 402 to the printer I/F module 404 (step S704).

Next, when the printer controller 201 obtains the feed reception notice transmitted from the printer I/F module 404 in response to the feed notice 1 (YES in step S705), the printer controller 201 determines with the print control module 402 whether the high-speed two-sided printing is available (step S706).

At this time, the print control module 402 specifies the sheet size to print according to the obtained acknowledgements 1 and 2, and determines whether the specified sheet size allows the high-speed two-sided printing. For example, when the length of the sheet of the specified sheet size in the conveyance direction is smaller than a predetermined length set up beforehand, it is determined that the high-speed two-sided printing is allowed.

On the other hand, when the length of the sheet of the specified sheet size in the conveyance direction is not smaller than the predetermined length, it is determined that the high-speed two-sided printing is not allowed. The predetermined length is prescribed on the basis of the length of the two-sided conveyance path 320 in FIG. 3, for example.

As a result of the determination in the step S706, when it is determined that the high-speed two-sided printing is allowed, the printer controller 201 generates data used to print on the first side of the first sheet according to the print data 2, and transmits the generated data and the print start notice 2 to the printer unit 202.

After that, the first side of the first sheet is printed according to the transmitted print start notice 2 (step S720). Then, the printer controller 201 determines whether the acknowledgement 4, which indicates that the print data 4 for the page 4 (i.e., the print data 4 that should be printed on the first side of the second sheet) was obtained, has been obtained (step S707).

As a result of the determination in the step S707, when the acknowledgement 4 has not been obtained, the printer controller 201 determines whether the last page notice has been obtained (step S708).

When the high-speed two-sided printing cannot be performed as a result of the determination in the step S706 or when the last page notice has been obtained as a result of the determination in the step S708, the printer controller 201 performs the normal two-sided printing henceforth (step S715), and finishes this process.

As a result of the determination in the step S708, when the last page notice has not been obtained, the printer controller 201 sets a predetermined time period to the timer 209 (step S709).

Next, the printer controller 201 determines whether the acknowledgement 4 is obtained before the predetermined time period elapses (step S710). In the embodiment, for example, the time period needed after the printing of the first side of the first sheet is completed until the printing of the second side of the first sheet is started is computed beforehand, and the predetermined time period is set up according to the computed time period. Specifically, the predetermined time period is set up according to the time period needed after the first side of the first sheet is printed with the transfer unit 309 and the fixing roller 313 in FIG. 3 until the first sheet is again conveyed to the printing conveyance path 308 through the switchback conveyance path 318, the two-sided conveyance path 320, and the two-sided feeding conveyance path 322.

When the acknowledgement 4 has been obtained as a result of the determination in the step S707 or when the acknowledgement 4 is obtained before the predetermined time elapses as a result of the determination in the step S710, the printer controller 201 transmits the conveyance notice 2 for the second sheets to the printer I/F module 404 so that the high-speed two-sided printing is performed.

Furthermore, the printer controller 201 generates data printed on the first side of the second sheet according to the print data 4, and transmits the generated data and the print start notice 4 to the printer unit 202. Then, the first side of the second sheet is printed in response to the transmitted print start notice 4 (step S711).

Next, the printer controller 201 prints the second side of the first sheet, the first side of the third sheet, the second side of the second sheet, and the second side of the third sheet in this order according to the print data 1, 6, 3, and 5, respectively (step S712) so as to continue the high-speed two-sided printing, and finishes this process.

As a result of the determination in the step S710, when the acknowledgement 4 cannot be obtained before the predetermined time elapses, the printer controller 201 transmits the conveyance notice that instructs conveyance of the first sheet of which the second side is a print side to the printer I/F module 404 so that the normal two-sided printing is performed. Furthermore, the printer controller 201 generates data printed on the second side of the first sheet according to the print data 1, and transmits the generated data and the print start notice 1 to the printer unit 202. The second side of the first sheet is printed in response to the transmitted print start notice 1 (step S713).

That is, in the embodiment, even if it is determined that the high-speed two-sided printing is allowed in the step S706, when the acknowledgement 4 cannot be obtained before the predetermined time period elapses, the printing (the high-speed two-sided printing) according to the print data 4 is once interrupted, and the printing (the normal two-sided printing) is performed according to the print data 1 that has been already obtained.

Next, the printer controller 201 prints the first side of the second sheet according to the obtained print data after ascertaining that the acknowledgement 4, which indicates that the print data 4 was obtained, has been obtained. Furthermore, the printer controller 201 prints the first side of the third sheet, the second side of the second sheet, and the second side of the third sheet in this order (step S714) according to the obtained print data 6, 3, and 5 so as to restart the high-speed two-sided printing after ascertaining that the acknowledgements 3, 5, and 6, which respectively indicate that the print data 3, 5, and 6 were obtained, have been obtained, and finishes this process.

According to the embodiment, when the acknowledgement 4, which indicates that the print data 4 was obtained, is not obtained after printing the first side of the first sheet in the case where the high-speed two-sided printing is performed, the first side of the second sheet is not printed but the second side of the first sheet is printed according to the print data 1 (the normal two-sided printing).

Accordingly, since the printing process continues without waiting to obtain the print data 4 for printing on the first side of the second sheet, the printing process is performed efficiently.

Moreover, when the acknowledgement 4, which indicates that the print data 4 for printing on the first side of the second sheet was obtained, is not obtained after printing the first side of the first sheet and before starting to print the second side of the first sheet, the first side of the second sheet is printed after printing the second side of the first sheet (the normal two-sided printing).

In this case, if the acknowledgement 4 is obtained by the end of the printing on the second side of the first sheet, the printing process for the first sheet and the printing process for the second sheet are performed continuously.

Furthermore, according to the embodiment, the normal two-sided printing is performed only for a sheet for which print data is not obtained in the high-speed two-sided printing. Accordingly, the high-speed two-sided printing, which excels the normal two-sided printing in the sheet conveyance efficiency, is performed preferentially. This prevents deterioration of the efficiency of the printing process.

The above-mentioned high-speed two-sided printing process in FIG. 7A and FIG. 7B determines whether the high-speed two-sided printing is continued according to the obtaining state of the print data 4, because the print data 4 has the highest possibility to cause the print data non-obtained state. In addition, the print data 6 for the page 6 has possibility to cause the print data non-obtained state. The reason is because the third sheet on which the print data 6 is printed is conveyed continuously after printing the second side of the first sheet (i.e., the third sheet is conveyed and printed fourthly (see FIG. 6C)), while the print data 6 is obtained finally (see FIG. 6A). Accordingly, the same process as the high-speed two-sided printing process in FIG. 7A and FIG. 7B mentioned above may be performed for the print data 6 so as to determine whether the high-speed two-sided printing is continued according to the obtaining state of the print data 6.

Moreover, when the acknowledgement 4 is not obtained after printing the first side of the first sheet and before starting to print the second side of the first sheet, the normal two-sided printing may continue even after printing the second side of the first sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-235505, filed Nov. 20, 2014, which is hereby incorporated by reference herein in its entirety.

What is claimed is:

1. A printing apparatus capable of two-sided printing, the printing apparatus comprising:
    a communicator configured to receive image data;
    a printing device configured to print an image on a sheet based on the image data received by said communicator;
    a timer configured to measure an elapsed time; and
    a controller configured to:
        instruct said printing device to print a first side of a first sheet;
        instruct, after the printing of the first side of the first sheet, said printing device to print a second side of the first sheet in a case where the elapsed time measured by said timer reaches a predetermined amount of time before said communicator receives image data to be printed on a first side of a second sheet; and
        instruct, after the printing of the first side of the first sheet, said printing device to print the first side of the second sheet in a case where said communicator has received the image data to be printed on the first side of the second sheet before the elapsed time measured by said timer reaches the predetermined amount of time.

2. The printing apparatus according to claim 1, wherein said controller instructs printing of the first side of a third sheet before the printing of the second side of the second sheet when said controller instructs the printing of the second side of the first sheet after the printing of the first side of the first sheet.

3. The printing apparatus according to claim 1, wherein image data of a second page is printed on the first side of the first sheet, and image data of a fourth page is printed on the first side of the second sheet.

4. The printing apparatus according to claim 1, further comprising a conveyor that conveys a sheet after printing a first side of the sheet concerned,
    wherein the predetermined time period is set up based on a time period needed to convey a sheet by said conveyor.

5. A printing apparatus capable of two-sided printing, the printing apparatus comprising:
    a communicator configured to receive image data;
    a printing device configured to print an image on a sheet based on the image data received by said communicator;
    a timer configured to measure elapsed time; and
    a controller configured to:
        instruct said printing device to print a first side of an (N−1)th sheet;
        instruct, after the printing of the first side of the (N−1)th sheet, said printing device to print a second side of the (N−1)th sheet in a case where the elapsed time measured by said timer reaches a predetermined amount of time before said communicator receives image data to be printed on a first side of an N-th sheet;
        instruct, after the printing of the first side of the (N−1)th sheet, said printing device to print the first side of the N-th sheet in a case where said communicator has received the image data to be printed on the first side of the N-th sheet before the elapsed time measured by said timer reaches the predetermined amount of time, wherein N is an integer that is equal to or larger than "2".

6. A control method for a printing apparatus that is equipped with a printing device that prints an image on a sheet based on image data and a timer unit that measures elapsed time, and is capable of two-sided printing, the control method comprising:
    receiving image data to be printed on a first side of a first sheet;
    instructing the printing device to print the first side of the first sheet;
    instructing, after the printing of the first side of the first sheet, the printing device to print a second side of the first sheet in a case where the elapsed time measured by the timer reaches a predetermined amount of time before image data to be printed on a first side of a second sheet is received; and
    instructing, after the printing of the first side of the first sheet, the printing device to print the the first side of the second sheet in a case where the image data to be printed on the first side of the second sheet is received before the elapsed time measured by the timer reaches the predetermined amount of time.

7. A control method for a printing apparatus that is equipped with a printing device that prints an image on a sheet based on image data and a timer that measures elapsed time, and is capable of two-sided printing, the control method comprising:

receiving image data to be printed on a first side of an (N−1)th sheet, N being equal to or larger than "2";

instructing the printing device to print the first side of the (N−1)th sheet;

instructing, after the printing of the first side of the (N−1)th sheet, the printing device to print a second side of the (N−1)th sheet in a case where the elapsed time measured by the timer reaches a predetermined amount of time before image data to be printed on a first side of an N-th sheet is received; and instructing, after the printing of the first side of the (N−1)th sheet, the printing device to print the the first side of the N-th sheet in a case where the image data to be printed on the first side of the N-th sheet is received before the elapsed time measured by the timer reaches the predetermined amount of time.

8. A non-transitory computer-readable storage medium storing a control program causing a computer to execute a control method for a printing apparatus that is equipped with a printing device that prints an image on a sheet based on image data and a timer unit that measures elapsed time, and is capable of two-sided printing, the control method comprising:

receiving image data to be printed on a first side of a first sheet;

instructing the printing device to print the first side of the first sheet;

instructing, after the printing of the first side of the first sheet, the printing device to a second side of the first sheet in a case where the elapsed time measured by the timer reaches a predetermined amount of time before image data to be printed on a first side of a second sheet is received; and instructing, after the printing of the first side of the first sheet, the printing device to print the the first side of the second sheet in a case where the image data to be printed on the first side of the second sheet is received before the elapsed time measured by the timer reaches the predetermined amount of time.

9. A non-transitory computer-readable storage medium storing a control program causing a computer to execute a control method for a printing apparatus that is equipped with a printing device that prints an image on a sheet based on image data and a timer unit that measures elapsed time, and is capable of two-sided printing, the control method comprising:

receiving image data to be printed on a first side of an (N−1)th sheet, N being equal to or larger than "2";

instructing the printing device to print the first side of the (N−1)th sheet;

instructing, after the printing of the first side of the (N−1)th sheet, the printing device to print a second side of the (N−1)th sheet in a case where the elapsed time measured by the timer reaches a predetermined amount of time before image data to be printed on a first side of an N-th sheet is received; and instructing, after the printing of the first side of the (N−1)th sheet, the printing device to print the the first side of the N-th sheet in a case where the image data to be printed on the first side of the N-th sheet is received before the elapsed time measured by the timer reaches the predetermined amount of time.

10. The printing apparatus according to claim 1, wherein the timer is configured to measure the elapsed time after printing of the first side of the first sheet is instructed.

* * * * *